United States Patent [19]

Graves

[11] Patent Number: 4,505,813
[45] Date of Patent: Mar. 19, 1985

[54] WASTEWATER TREATMENT PLANT

[75] Inventor: Jan D. Graves, Norwalk, Ohio

[73] Assignee: Norwalk Wastewater Equipment Company, Norwalk, Ohio

[21] Appl. No.: 388,246

[22] Filed: Jun. 14, 1982

[51] Int. Cl.³ .............................................. C02C 1/02
[52] U.S. Cl. ..................................... 210/86; 210/104;
210/108; 210/170; 210/202; 210/221.2;
210/248; 210/260; 210/411; 210/532.2;
210/539; 261/87; 417/421
[58] Field of Search ............... 210/106, 108, 170, 248,
210/205, 202, 195.3, 195.4, 196, 532.1, 532.2,
411, 433.1, 435, 437, 438, 130, 200, 791, 221.2,
259, 260, 126, 86, 104, 208, 434, 539, 537, 739,
220, 221.1; 261/87, 91; 417/421

[56] References Cited

U.S. PATENT DOCUMENTS

| | | | |
|---|---|---|---|
| 1,349,452 | 8/1920 | Griffith | 210/532.3 |
| 1,925,777 | 9/1933 | Sperling | 261/87 |
| 2,125,722 | 8/1938 | Hawkins | 210/86 |
| 2,918,016 | 12/1959 | Olson | 417/421 |
| 2,928,661 | 3/1960 | MacLaren | 261/87 |
| 2,987,186 | 6/1961 | Burgoon et al. | 210/532.2 |
| 3,077,988 | 2/1963 | Anderson et al. | 210/86 |
| 3,157,128 | 11/1964 | Hustinx | 417/421 |
| 3,402,818 | 9/1968 | Sasaki | 210/411 |
| 3,415,378 | 12/1968 | Fukuda | 210/195.4 |
| 3,487,937 | 1/1970 | Koulovatos | 210/195.3 |
| 3,627,131 | 12/1971 | Goodman | 210/108 |
| 3,709,364 | 1/1973 | Savage | 210/196 |
| 3,776,531 | 12/1973 | Ebner et al. | 261/87 |
| 3,778,233 | 12/1973 | Blough et al. | 261/87 |
| 3,825,119 | 7/1974 | Rost | 210/196 |
| 3,883,427 | 5/1975 | Oldham et al. | 210/195.4 |
| 3,951,804 | 4/1976 | Smith | 210/170 |
| 4,230,578 | 10/1980 | Culp et al. | 210/86 |
| 4,267,052 | 5/1981 | Chang | 261/87 |
| 4,319,998 | 3/1982 | Anderson | 210/86 |
| 4,325,823 | 4/1982 | Graham | 210/86 |
| 4,439,323 | 3/1984 | Ball | 210/532.2 |

FOREIGN PATENT DOCUMENTS 542601 6/1957 Canada .............................. 210/170

Primary Examiner—Richard V. Fisher
Assistant Examiner—W. Gary Jones
Attorney, Agent, or Firm—Diller, Ramik & Wight

[57] ABSTRACT

This disclosure is directed to a wastewater treatment plant which includes pretreatment, aeration, final clarification and overflow/backwash chambers adapted to receive a fluid, such as home wastewater, which is to be subjected to extended aeration or aerobic digestion, the aeration chamber including an aerator having a shaft whose lower end is normally received in the fluid which is to be treated, an aerator foam deflector carried by the shaft which under abnormally high fluid levels increases the torque on the shaft and, thus, indicates abnormal operation, the final clarification chamber including a demand use filter, an overflow outlet operative should the filter become disabled, and a backwash nozzle located in the filter by reverse pumping therethrough fluid pumped from the overflow or backwash chamber.

69 Claims, 12 Drawing Figures

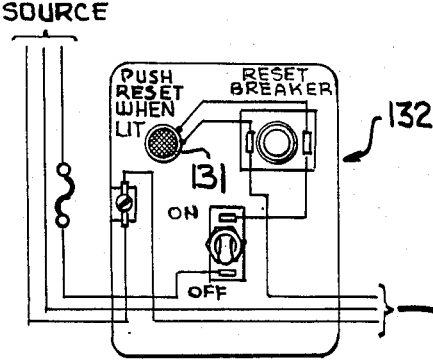
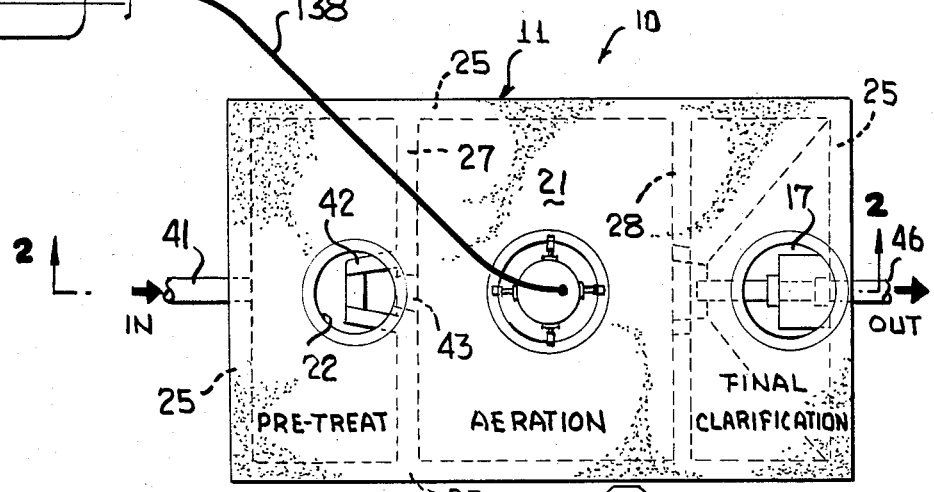
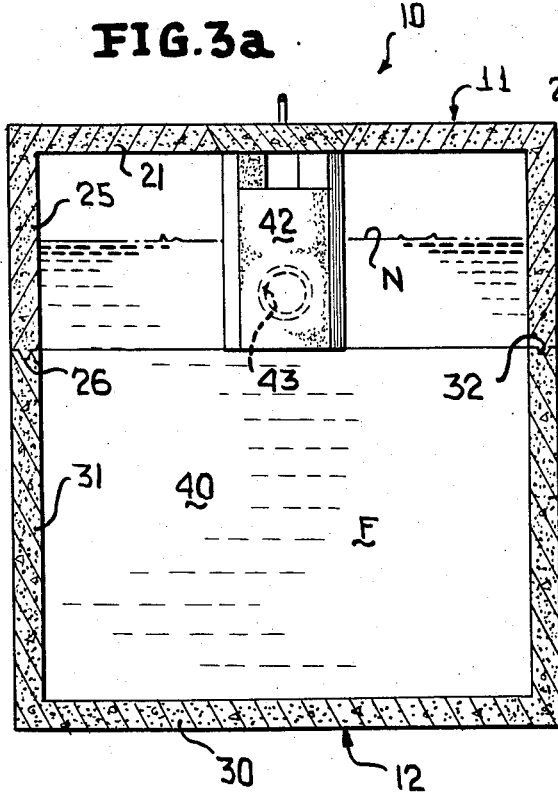
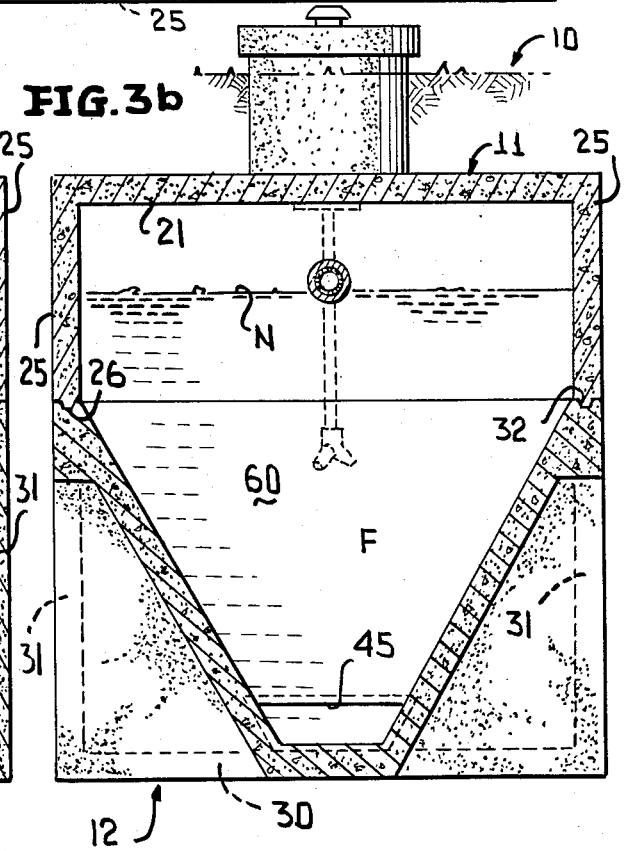
FIG. 1
FIG. 3a
FIG. 3b

FIG.4
FIG.5
FIG.6
FIG.7
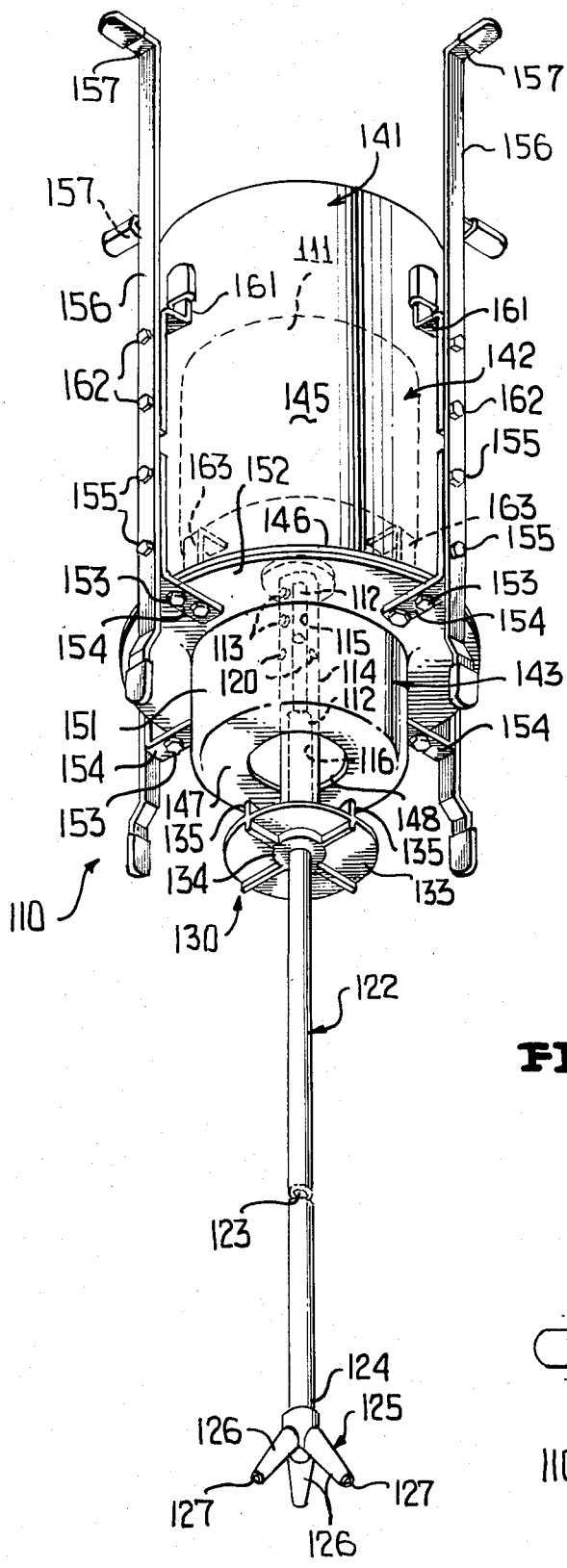
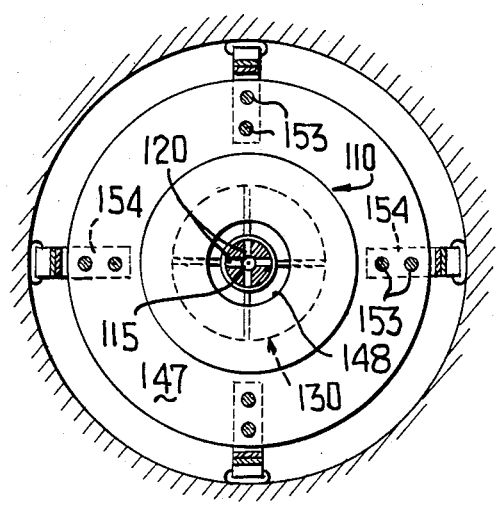
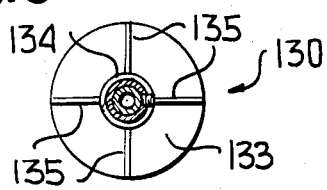
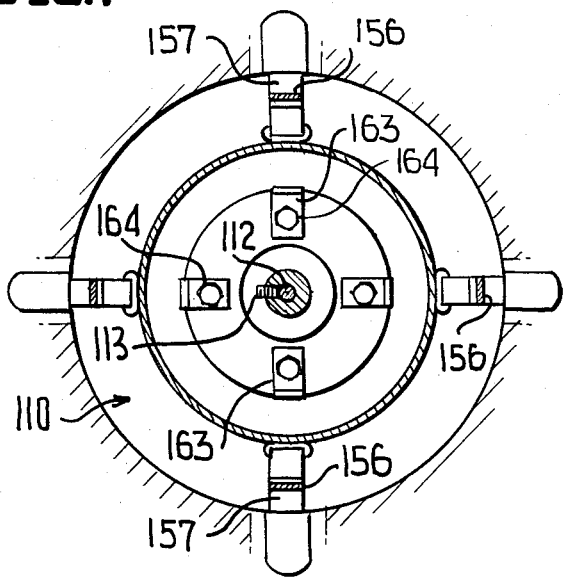

WASTEWATER TREATMENT PLANT

The present invention is directed to a wastewater treatment plant particularly designed for an individual home and which utilizes a process known as extended aeration or aerobic digestion. The wastewater treatment process itself is not novel, and many conventional apparatuses utilizing the same are well known, but the present invention provides novel, innovative and unobvious structures and attendant advantages and objects, among which are the following.

A primary object of this invention is to provide a novel wastewater treatment plant which includes a pretreatment chamber, an aeration chamber and a clarification chamber, means for conducting fluid which is adapted to be treated into the pretreatment chamber, from the pretreatment chamber into the aeration chamber, from the aeration chamber into the clarification or final clarification chamber, and from the latter chamber outwardly therefrom, means for filtering the fluid prior to the discharge thereof from the clarification chamber, the filtering means being constructed and arranged for increasing its filtering capacity in response to fluid level rise in the clarification chamber, means for aerating the fluid in the aeration chamber, and the aerating means including means responsive to an inoperative condition of the filtering means and a corresponding rise in the fluid level in the aeration chamber for indicating fluid treatment malfunction.

A further object of this invention is to provide a novel wastewater treatment plant of the type defined wherein an overflow conduit is provided in the clarification chamber to permit fluid to flow in an unobstructed fashion therefrom should the filtering means become obstructed.

Yet another object of this invention is to provide a novel wastewater treatment plant of the type described wherein the aerating means includes a shaft, an electric motor for rotating the shaft, the shaft having a portion normally within and a portion normally outside of the fluid in the aeration chamber under normal operations, the responsive means being carried by the shaft portion normally outside of and above the fluid in the aeration chamber under normal operation, and the responsive means being operative for increasing the torque on the rotating shaft under above-normal levels of fluid in the aeration chamber.

Still another object of this invention is to provide a novel wastewater treatment plant of the type immediately aforesaid wherein the responsive means includes at least one vane projecting radially from the shaft, and since the current through the windings of the motor is proportional to the torque on the shaft, the current is utilized as a criteria to provide a visual, audible or like indication of above-normal fluid height and/or filter blockage which is further indicative of fluid treatment malfunction.

Yet another object of this invention is to provide a novel wastewater treatment plant as aforesaid including means for defining an overflow chamber, the discharge from the clarification chamber being directed into the overflow chamber, and means for pumping fluid from the overflow chamber through the filtering means in a reverse flow direction to clean the filtering means and render any malfunction or blockage thereof normal and operative.

Yet another object of this invention is to provide a novel wastewater treatment plant of the type immediately aforesaid wherein the fluid pumping means is an electric pump, means responsive to a predetermined depth of fluid in the overflow chamber for actuating the operation of the electric pump, conduit means leading from the pump into an interior of the filtering means, the conduit means including a portion having a plurality of orifices disposed within the filtering means interior, the conduit portion being in generally coaxial relationship to the filtering means, and the plurality of orifices being disposed to direct fluid therefrom against a plurality of different areas of the filtering means to effectively backwash the same.

A further object of this invention is to provide a novel wastewater treatment plant including means for preventing a motor of the aerator means from becoming flooded, and further means for circulating air to air-cool the aerator motor during the operation thereof.

Another object of this invention is to provide a wastewater treatment plant which includes an aeration chamber adapted to receive fluid to be aerated, a shaft depending downwardly in the aeration chamber, the shaft having a lower terminal end portion adapted to project into the fluid when the fluid is at a predetermined normal fluid level, the shaft also having an upper terminal end portion normally disposed above the fluid when the fluid is at its predetermined normal level, an electric motor for rotating the shaft, and means for connecting the electric motor to the upper terminal end portion, the novel improvement including means for preventing the electric motor from being flooded upon abnormal fluid rise in the aeration chamber beyond the predetermined normal fluid level, the flood preventing means including means for defining a housing within which the electric motor is located, the housing means include the bottom wall, an opening in the bottom wall through which the shaft projects, and the housing means being air-tight in a portion thereof surrounding the electric motor whereby fluid which rises above the predetermined normal fluid level and enters the housing means through the opening will be prevented from flooding the electric motor under the influence of the entrapped air within the air-tight housing portion.

Yet another object of this invention is to provide a novel wastewater treatment plant of the type immediately aforesaid in which the air-tight housing portion is a one-piece inverted cup-shaped member, the bottom wall is part of a cup-shape member, both cup-shaped members having respective terminal peripheral edge portions, and the cup-shaped members being joined together at their peripheral edge portions.

A further object of this invention is to provide a novel wastewater treatment plant which includes an aeration chamber adapted to receive fluid to be aerated, a shaft depending downwardly in the aeration chamber, the shaft having a lower terminal end portion adapted to project into the fluid when the fluid is at a predetermined normal fluid level, the shaft also having an upper terminal end portion normally disposed above the fluid when the fluid is at its predetermined and normal fluid level, an electric motor connected to the shaft upper terminal end portion for rotating the shaft to effect aeration of the fluid within the aeration chamber, the electric motor having stator and rotor windings, the primary object of the improved combination being that of means carried by the shaft upper terminal end portion responsive to fluid rise in the aeration chamber above the predetermined normal fluid level for increasing the torque or drag on the shaft which causes proportional current through the motor windings which reflects the increased torque, and means responsive to the increased current for indicating the abnormal fluid rise.

Still another object of this invention is to provide a wastewater treatment plant as aforesaid wherein the indicating means is a visual indicator.

Another object of this invention is to provide a novel wastewater treatment plant including an aeration chamber adapted to receive fluid to be aerated, an aerator shaft depending downwardly in the aeration chamber, the shaft having a lower terminal end portion adapted to project into the fluid when the fluid is at a predetermined normal fluid level, the shaft also having an upper terminal end portion normally disposed above the fluid when the fluid is at its predetermined fluid level, an electric motor connected to the shaft upper terminal end portion for rotating the shaft to effect aeration of the fluid within the aeration chamber, and novel means for air-cooling the electric motor, the air-cooling means including means for defining a housing, the electric motor being in generally spaced relationship to the housing whereby air can circulate between an opening defining an air intake port for the housing, the shaft having a longitudinal bore, at least one aspirator port in fluid communication with the bore at the shaft lower terminal end portion, and an air inlet port in fluid communication with the bore at the shaft upper terminal end portion and within the housing whereby upon rotation of the a pressure differential is created between the aspirator port and the air inlet port thereby drawing air into the housing through the air intake port and circulating the same between the electric motor and the housing thereby air cooling the electric motor while simultaneously dispersing air into the fluid through the aspirator port to establish extended aeration.

Yet another object of this invention is to provide an improved wastewater treatment plant as immediately aforesaid wherein the shaft projects outwardly of the housing through the air intake port.

A further object of this invention is to provide a novel wastewater treatment plant which includes a final clarification chamber for fluid which is to be treated, means defining an overflow chamber for fluid, conduit means for conducting fluid from the clarification chamber to the overflow or backwash chamber, the conduit means including an inlet opening into the clarification chamber and another outlet opening into the overflow chamber, filtering means for filtering material from the fluid before the fluid enters the inlet, the improvement including means for pumping fluid from the overflow chamber through the filtering means in a reverse flow direction to clean the filtering means, and means responsive to a predetermined depth of fluid in the overflow chamber for actuating the fluid pumping means.

Another object of this invention is to provide a novel wastewater treatment plant in the manner just described wherein the pumping means includes pipe means for conducting fluid from the overflow chamber through the conduit means into an interior of the filtering means, the pipe means including a portion having a plurality of orifices disposed within the filtering means interior, the pipe means portion being in generally coaxial relationship to the filtering means, and a plurality of orifices being disposed to direct fluid therefrom against a plurality of different areas of the filtering means to effectively backwash the same.

With the above and other objects in view that will hereinafter appear, the nature of the invention will be more clearly understood by reference to the following detailed description, the appended claims and the several views illustrated in the accompanying drawings.

FIG. 1 is a top plan view of a novel wastewater treatment plant constructed in accordance with this invention, and illustrates pretreatment, aeration and final clarification chambers, and an in-house control panel which indicates abnormally high fluid levels.

FIG. 3a is a sectional view taken generally along line 3a—3a of FIG. 2, and illustrates a wall in the pretreatment chamber having a portion in line with an opening between the pretreatment chamber and the aeration chamber.

FIG. 3b is a sectional view taken generally along line 3b—3b of FIG. 2, and illustrates an opening between the aeration and the clarification chambers and the generally downwardly converging relationship of a lower portion of the clarification chamber.

FIG. 4 is an enlarged perspective view of the aerator associated with the aeration chamber of FIG. 2, and illustrates a motor within an air-tight housing, an intermediate tubular shaft connecting a drive shaft of the motor to the aspirator shaft, and a plastic aerator foam deflector carried by the aerator shaft.

FIG. 5 is an enlarged cross-sectional view taken generally along lines 5—5 of FIG. 8, and illustrates a plurality of radially directed air inlet ports associated with an intermediate tubular shaft of the aerator for creating a pressure differencial which exhaust air from one of a plurality of aerator or aspirator ports at a lower terminal end portion of the aerator shaft.

FIG. 6 is an enlarged sectional view taken generally along line 6—6 of FIG. 8, and illustrates means in the form of a vane which is responsive to high fluid levels for impressing a torque upon the aerator shaft for lighting the light on the control panel shown in FIG. 1.

FIG. 7 is an enlarged sectional view taken generally along line 7—7 of FIG. 8, the illustrates a plurality of brackets for supporting the aerator from a riser of a casing of the wastewater treatment plant.

Figure 2:
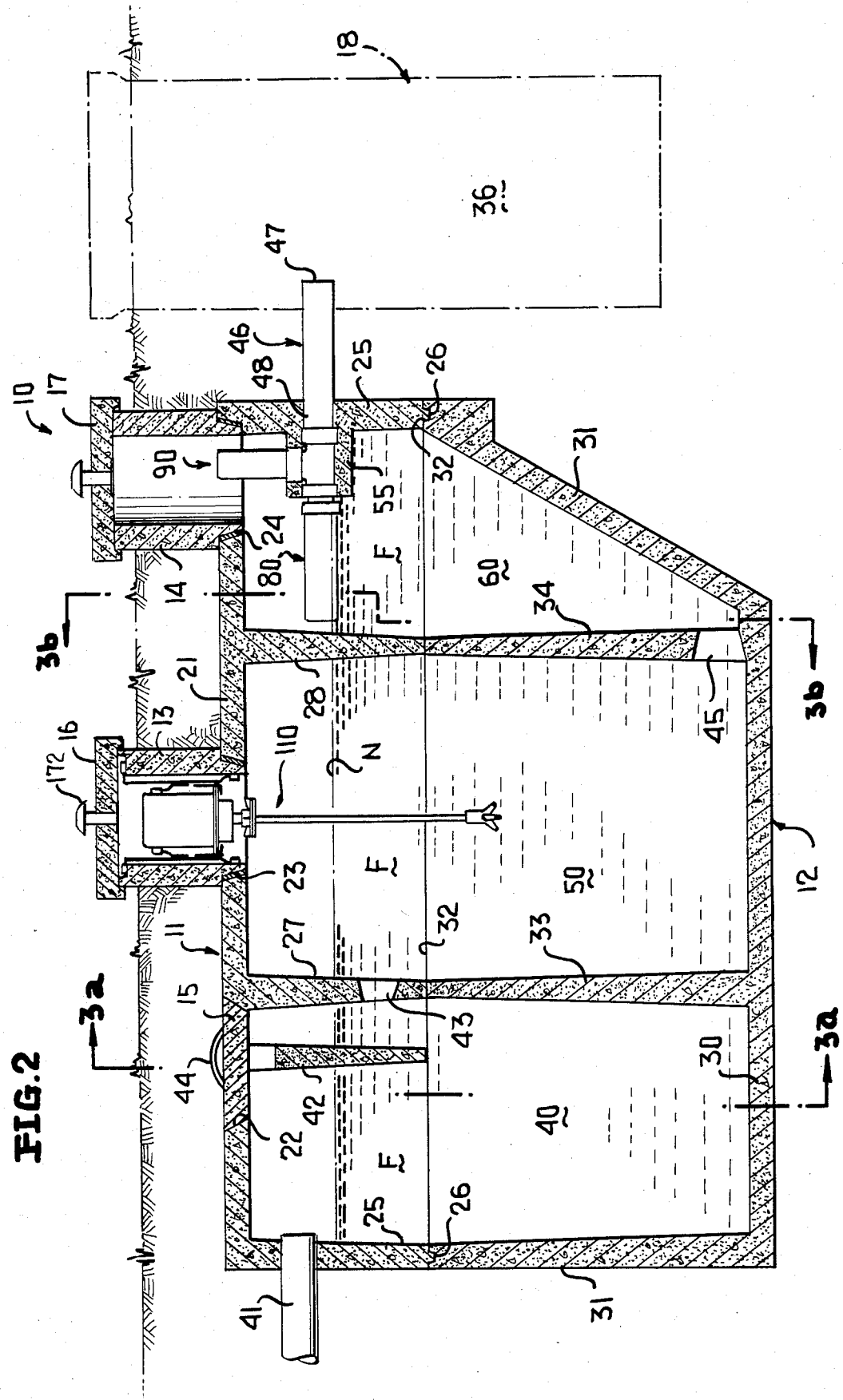
FIG. 2 is an enlarged cross-sectional view taken generally along line 2—2 of FIG. 1, and illustrates more detail the pretreatment, aeration and clarification chambers, along with means in the aeration chamber for aerating the fluid therein and means in the clarification chamber for filtering fluid prior to its discharge therefrom.

A novel wastewater treatment plant constructed in accordance with this invention is illustrated in FIGS. 1 through 4 of the drawings, and it is generally designated by the reference numeral 10.

The wastewater treatment plant 10 is normally designed for use in conjunction with individual homes, although the same is readily adapted to many municipal operations and is essentially designed to utilize the well known extended aeration or aerobic digestion process of wastewater or like fluid treatment. Essentially, the wastewater treatment plant 10 includes an upper concrete casting 11, a lower concrete casting 12, a pair of tubular concrete castings, housings or risers 13, 14 (FIG. 2), a plurality of concrete covers 15, 16, and 17, and, in certain installations, an additional concrete casting or housing 18 (FIG. 9) having a cast concrete cover 20.

The casting or housing 11 includes a top wall 21 having formed therein a plurality of openings 22, 23 and 24, a peripheral wall or skirt 25 having a lowermost terminal edge 26, and a plurality of depending transverse walls 27 and 28. The lower casting or housing of the wastewater treatment plant 10 likewise includes a bottom wall 30, a peripheral wall or skirt 31, an uppermost terminal peripheral edge 32 and two transverse upstanding walls 33, 34. The edges 26, 32 are in mating relationship and suitable grouting (not shown) is positioned therein to form an appropriate seal. Like sealing material is provided between the opposed abutting edges of the walls 27, 33 and 28, 34 (not shown). Thus, in the assembled condition of the castings 11, 12, as is best illustrated in FIGS. 1 through 4 of the drawings, the same define a pretreatment chamber 40, an aeration chamber 50, and a final clarification chamber 60. The casting or housing 18 (FIG. 9) defines by its cylindrical or tubular wall 36 and an associate bottom wall 37 a backwash or overflow chamber 70.

Means in the form of a hollow pipe 41 define an inlet for introducing fluid, such as wastewater or like fluid or effluent F which is to be treated by wastewater treatment plant 10 into the pretreatment chamber 40. Under normal conditions of operation, the fluid F within the pretreatment chamber 40, as well as within the aeration chamber 50 and the final clarification chamber 60, assumes a normal level or normal flow line N (FIG. 2).

A wall 42 (FIGS. 2 and 3) projects downwardly into the pretreatment chamber 40 from the top wall 21 and a lower end portion thereof (unnumbered) is in line with means 43 defining an opening for communicating fluid from the pretreatment chamber 40 into the aeration chamber 50. The wall 42 thus prevents material which might float at the normal level N from entering into and clogging the opening 43, it being noted that all fluid must, in effect, flow across or bridge the lower edge of the wall 42, thus preventing floating material from passing the wall 42 and, thus, clogging the opening 43. The cover 15 includes, of course, an appropriate handle 44.

A lower end portion (unnumbered) of the wall 34 includes a generally polygonal shaped opening 45 (FIGS. 2 and 4) through which fluid flows from the bottom of the aeration chamber 50 into the bottom of the final clarification chamber 60.

Figure 8:
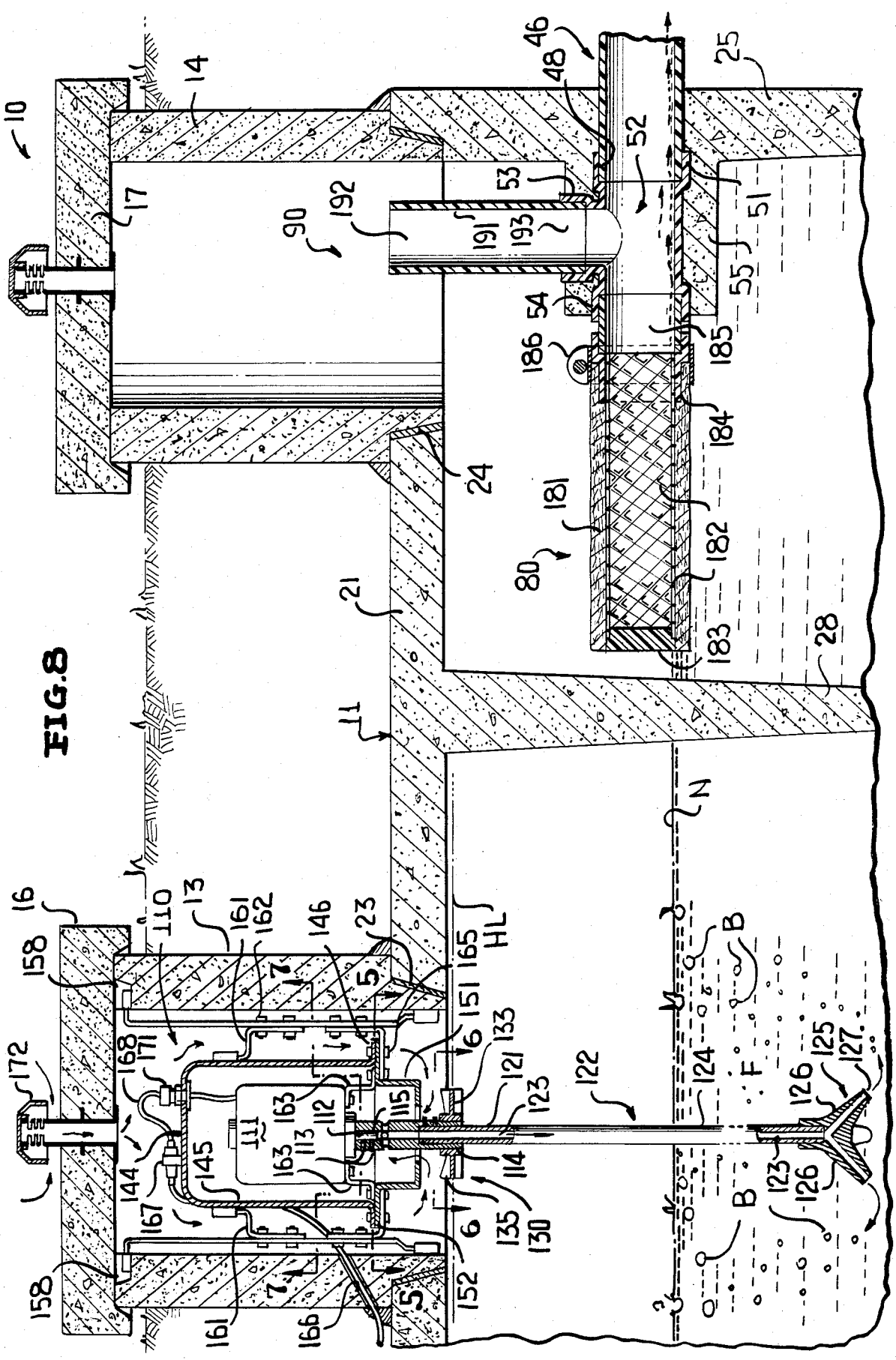
FIG. 8 is an enlarged fragmentary sectional view of the aeration chamber and the final clarification chamber of FIG. 2, and illustrates with more detail the aerator and the filter associated with an overflow pipe and a discharge pipe of the clarification chamber.
Figure 9:
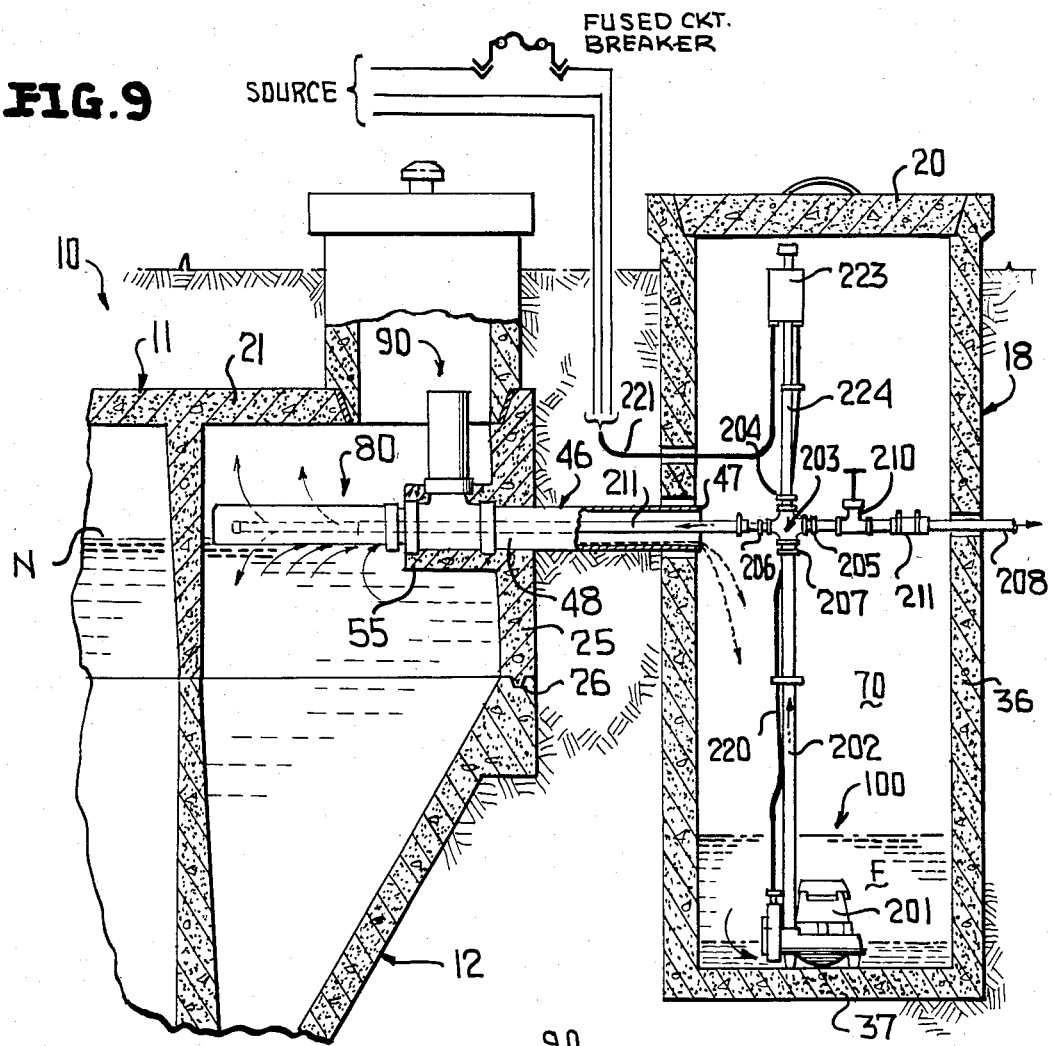
FIG. 9 is a fragmentary sectional view of the right-hand corner of the wastewater treatment plant, and illustrates an additive backwash or overflow chamber, a pump therein, and conduit means for directing fluid into the filter in a reverse direction for backwashing the same.
Figure 10:
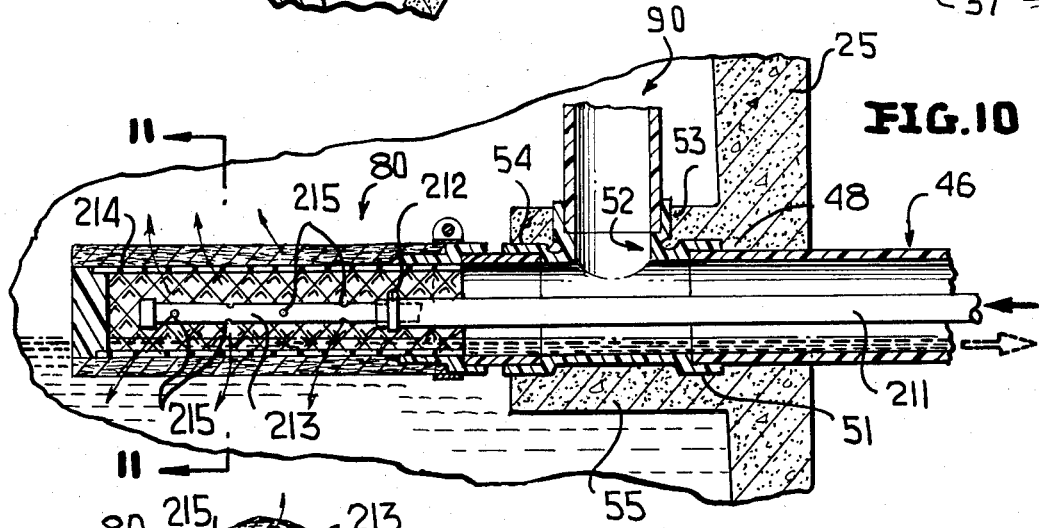
FIG. 10 is an enlarged fragmentary similar to that shown in FIG. 8, and illustrates more specific details of the backwash nozzle including a plurality of radial orifices for directing fluid against random internal areas of the filter to clean the same.
Figure 11:
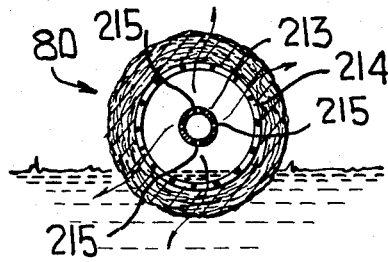
FIG. 11 is a cross-sectional view taken generally along 11—11 of FIG. 10, and illustrates a stainless steel internal skeleton upon which the filter is supported.

Means generally designated by the reference numeral 46 (FIGS. 2, 8 and 9) in the form of a pipe discharge is fluid F from the final clarification chamber 60 to atmosphere or into the backwash chamber or overflow chamber 70, as shown respectively in FIGS. 2 and 9 of the drawings. The outlet pipe or conduit 46 includes an outlet end 47 and an inlet end 48 (FIGS. 8 and 10) with the latter being received in an arm 51 of an inverted T-fitting 52 which includes a vertical disposed leg 53 and another arm 54 in axial alignment with the arm 51. The T-fitting or coupling 52 is immovably housed and held captive in a cast-in-place portion 55 of the peripheral wall 25 of the casting 11. The T-fitting is designed to accommodate filtering means 80 for filtering the fluid in the final clarification chamber 60 prior to its discharge through the outlet pipe or conduit 46, in a manner to be described more fully hereinafter, and to also accommodate means 90 for permitting fluid to overflow and be discharged through the pipe 46 should the filtering means 80 become blocked or inoperative, and the latter will be more fully described in conjunction with means 100 (FIG. 9) associated with the backwash or overflow chamber 70 for backwashing and, thus, unblocking the filtering means 80.

Reference is now made particularly to FIGS. 2 and 4 through 8 of the drawings which illustrate means generally designaged by the reference numeral 110 for aerating the fluid F within the aeration chamber 50. The aeration means or aerator 110 includes a 115 volt, 60 hertz, single phase, fractional horsepower, totally enclosed electric motor 111 (FIG. 4) having the usual stator and rotor windings (not shown). The aerator motor 111 includes an output shaft 112 which is secured by connecting means in the form of two set screws 113 to an intermediate tubular shaft or sleeve 114 formed of stainless steel and having a bore 115 and a counter bore 116. The bore 115 receives the shaft 112 of the motor 111 and is secured thereto by the set screws 113. The intermediate sleeve also includes four ⅜ inch diameter air inlet holes, ports or bores 120 which are in fluid communication with the bore 115 and the counter bore 116. The counter bore 116 receives an upper terminal end portion 121 of another or main aspirator shaft 122 which is provided with an axial bore 123 through its entire length including a lower terminal end portion 124 thereof which is glued or otherwise fixed to a four port aspirator 125 with each aspirator nozzle being generally designated by the reference numeral 126 and its aspirator orifice by the reference numeral 127. As the shaft 122 is rotated by the aerator motor 111, a pressure differential is created between the fluid F within which the aspirator 125 is immersed below the normal level or normal flow line N (FIG. 8) and atmosphere resulting in air being drawn into the radially disposed air inlet ports 120, the bore 115, the bore 123 and exiting the aspirator ports 125 as bubbles B which effect extended aeration in a conventional manner. The air flow latter-described is also indicated by the unnumbered headed arrows, and this same air flow also air-cools the motor 111 in a manner which will be described more fully hereinafter.

Means generally designated by the reference numeral 130 induces torgue in response to an abnormal height of the fluid F within the aeration chamber 50 as might be caused by, for example, the filtering means 80 becoming clogged, and this fact can be indicated to a homeowner by a lamp 131 (FIG. 1) being lit on a control panel 132 in the home whereat the wastewater treatment plant 10 might be installed. The means 130 is a fiberglass reinforced plastic aerator foam deflector which is glued to a serrated portion (not shown) of the intermediate sleeve 114. The aerator foam deflector 130 includes an annular or disc-like member 133 having a central hub 134 and four equally spaced radially outwardly directed vanes or fins 135. Under normal operation, the aerator motor 111 simply rotates the shaft means or shafts 114, 122 and, thus, the aerator foam deflector 130 rotates well above the normal height or level N of the fluid F within the aeration chamber 50. However, should the filtering means 80 become clogged and the fluid F thus rise in the aeration chamber 50, as well as in the pretreatment and clarification chambers 40 and 60, respectively, eventually the abnormally high level of the fluid or the foam thereatop, which is generally designated by the reference characters HL in FIGS. 2 and 8 of the drawings, will reach the rotating aerator foam deflector 130. As the aerator foam deflector 130 engages the foam or the fluid at the excessively high level HL, the foam or fluid will create excess or increased drag or torque upon the shafts 114, 122. Since the current through the motor 111 is proportional to the torque, this change in current at the high level HL can be sensed and/or responded to by conventional circuitry and used as a criteria of malfunction indicative of abnormal fluid height caused by blockage of the filtering means 80. In such cases, any conventional torque-dependent and thus current proportional circuit can be utilized as those in U.S. Pat. Nos. 3,481,235 or 3,880,361, to light the lamp 131 of the control panel 132 over suitable electrical conductors 138 to visually indicate to the homeowner that there is a malfunction in the wastewater treament plant 10 and, obviously, initiating repair thereof.

The aerator motor 111 is preferably housed in housing means 141 which includes an upper housing 142 and a lower housing 143. The upper housing 142 is of an inverted generally cup-like configuration having a top wall 144, a peripheral, cylindrical wall 145, and a radially outwardly directed peripheral or peripheral edge portion 146. The lower housing 143 includes a bottom wall 147 having formed therein a relatively large air intake port 148, a peripheral, cylindrical wall 151 and a radially outwardly directed peripheral flange or peripheral edge portion 152. The flanges or peripheral edge portions 146, 152 of the upper and lower housings 142, 143, respectively, are secured to each other by conventional bolts and nuts 153 which are also secured to four angle brackets 154. Each angle bracket 154 is secured by nuts and bolts 155 to one of four cadmium plated steel stand-off brackets 156 having outwardly directed upper end portions or anti-rotation lugs 157, each of which are received in an associated groove 158 (FIG. 8) of an upper wall (unnumbered) of the riser 13. Since each lug 157 fits snugly in its associated groove 158, the same and the connections latter-noted prevent the housing 141 and, thus, the aerator motor 111 and its components from rotating under operating torque. Four other angle brackets 161 are bolted to the stand-off brackets 156 by nuts and bolts 162 and ends of the brackets 161 carry a Teflon, plastic or like coating (unnumbered) and bear against the outside of the upper housing wall 145, as is readily apparent in FIGS. 4 and 8 of the drawings. Lower ends (unnumbered) of the stand-off brackets 156 carry plastic, rubber or similar shock-absorbing and vibration-dampening material, and these ends contact an inner surface (unnumbered) of the riser 13. Four additional motor mounting brackets 163 are connected by bolts 164 to the aerator motor 111 and by nuts and bolts 165 to the flange 152 of the lower housing 143.

The electrical conductors 138 (FIG. 1) pass through a bore 166 in the riser 13, and the bore 166 is provided with suitable grouting material. The electrical conductors or cables 138 are connected to a quick disconnect moisture-proof cable connector 167 and further cables or electrical conductors 168 pass through an air-tight and a fluid-tight connector 171. It is important that the connector 171 is in air-tight relationship to a hole (unnumbered) formed in the top wall 144 of the upper housing 141, and it is equally important that there is an air-tight seal between the flanges or peripheral edge portions 146, 152 to effect and create a flood-proof atmosphere for the aerator motor 111 within the housing 141. For example, should the fluid F rise beyond the normal level N up to and beyond the high level HL, the same may well not be observed by a person even though the lamp 131 is lit and, hence, the fluid F will rise beyond the level HL and begin flowing into the lower housing 143 through the air intake port 148. However, if the entire interior of the housing 141 is air tight, then the rising fluid F upwardly beyond the air intake port 148 will be resisted by air entrapped within the housing 141 and particularly the upper housing 142 thereof, thereby preventing the motor 111 from becoming flooded and/or damaged, irrespective of the reason for the entry of the fluid F within the housing as could, for example, occur should the overflow means 90 be rendered inoperative for some reason. Thus, irrespective of the operative or inoperative nature of the overflow means 90, the air-tight construction of the housing 141 makes certain that any fluid F which may otherwise enter and adversely effect the aerator motor 111 will be resisted by air pressure build-up by the very same entry of fluid F into the housing and, thus, the elevation of the fluid F within the housing will never reach the aerator motor 111, its windings, etc., and damage thereto will not occur.

The same air-tight construction of the housing 141 achieves efficient air-cooling of the aerator motor 111 under normal operating conditions. For example, the cover 16 has a conventional vent assembly 172 (FIG. 8) associated therewith which permits air to be drawn through the cover 16 and into the area between the riser 13 and the exterior of the housing 141 during the rotation of the shaft 122 and the pressure differential heretofore noted. This suction effect drives the air along the outside of the housing 141 and through the air intake port 148 into and around the area between the interior of the housing 141 and the aerator motor 111, again as indicated by the unnumbered headed arrows in FIG. 8. Some of this air is drawn through the air inlet ports 120, while other portions of the air current are simply circulated within the housing 141 and the space between the same and the exterior of the aerator motor 111 to thus air-cool the aerator motor 111.

Referring particularly to FIGS. 8 through 11 of the drawings, the filtering means 80 is a demand/use filter in the sense that more of its filter media is exposed to the fluid F as the fluid rises beyond its normal level N. The filtering means or filter 80 includes a generally annular tube approximately 18 inches in length and 1 inch in thickness of 7 denier blend of inert fabric which is generally designated by the reference numeral 181 supported upon a skeleton 182 of $\frac{1}{8}$ inch stainless steel rod in cylindrical form. One axial end of the tubular filter 181 is closed by a cap 183 and the opposite end is glued to a polyethylene socket 184. The skeleton 182 is also glued to the interior surface (unnumbered) of the annular or tubular filter 181 and also to the inner surface (unnumbered) of the polyethylene socket 184. The polyethylene socket 184 is fitted upon a polyethylene ring 185 and is clamped to the latter by a stainless steel clamping band 186 to permit the ready removal of the filtering means 80 and the reapplication of a new filtering means thereto. The ring 185 is preferably bonded by an appropriate solvent to the interior of the arm 54 of the T-fitting 52.

As the fluid F in the final clarification chamber 60 rises toward and to its normal level N, the filtering means 80 and particularly the filter 181 thereof is fully operative under normal flow rates to filter the fluid prior to the discharge thereof through the outlet pipe or conduit 46. However, should the flow rate increase and the fluid level rise beyond the normal level N, the higher the fluid level rises the more surface area of the filter 181 exposed to the fluid and, thus, the greater filtering capacity, hence, the operation of the filtering means in response to demand or use. Obviously, when the entire filtering means 80 is immersed in the fluid F, filtration operation is at its maximum. Should, however, the filtering means 80 and specifically the filter 181 media thereof become blocked for any reason whatever, the fluid F will eventually reach the overflow means 90 which is simply a conduit or pipe 191 having an inlet 192 and an outlet 193 solvent-bonded to the leg 53 of the T-fitting 52. It should be particularly noted that the inlet 192 of the means 90 is above the aerator foam deflector 130 and the high level line HL. Stated otherwise, the aerator foam deflector 130 is positioned heightwise at an elevation between the filtering means 80 and the inlet 192 of the overflow means 90. Thus, should the fluid F rise beyond the normal level N and reach the abnormal height HL, the first indication of malfunction of the plant 10 is that effected by the increased torque through the means 130 and the associated lit lamp 131. This could, of course, be simply a momentary condition but if prevelant and if either the lit lamp 131 is not seen or alternatively an audible signal heard, the fluid level can well rise beyond the line HL in the clarification chamber but upon reaching the inlet 192 will bypass the filtering means 180 and flow outwardly of the clarification chamber 60 through the conduit 46. Furthermore, though the fluid may reach the edge of the inlet 192 of the overflow means 90, the same level of fluid may not reach this height within the aerator motor housing 141 because of the ever increasing air pressure built-up within the housing 141 in the manner heretofore described. Thus, even under extreme conditions when overflow takes place through the inlet 192 of the overflow means 90, the motor 111 remains flood-proof since the water level within the housing 141 will not rise to a height to remotely touch or adversely affect the motor 111.

While the filtering means 80 can be readily removed and replaced, it is also within the scope of the present invention to provide the backwash means 100 (FIGS. 9 and 10) for directing fluid from the overflow or backwash chambers 70 into the interior of the filtering means 80. The backwash means 100 includes a conventional automatic backwash pump 201 supported conventionally upon the bottom wall 37 of the chamber 70. The pump 201 is a ¼ horsepower 1550 RPM 115 volted diaphragm-type liquid level control pump which preferably is inoperative or does not pump when the liquid level is below 2 inches in the chamber 70 but can be adjustably regulated to pump fluid F within the backwash chamber 70 when its height is anywhere between 2 inches and 12 inches above the bottom wall 37. The means 100 further includes conduit means 202 through which the fluid is pumped by the pump means or pump 201 to a 1¼ inch cross or cross-fitting 203 having four arms 204 through 207 with the pipe or conduit 204 being connected to the arm 207.

The arm 205 is connected to a discharge line 208 which includes a 1 inch 125 pound gate valve 210 and a flexible coupling 211. During a preset 30 second backwash running time of the pump 201, 16 gallons of fluid F within the backwash/discharge chamber 70 can be pumped and discharged through the line 208. During this same 30 second time period, four gallons of liquid are directed through the reduced arm 206 of the cross-fitting 203 and into a flexible hose 211 which is connected by a clamp 212 (FIG. 10) to a 1 inch diameter PVC nozzle 213 having a cap 214 at its terminal end and eight discharged orifices or holes 215 arranged in staggered pairs, as is readily apparent from FIG. 10. The fluid discharged from these nozzles 215 impinges against different areas of the interior (unnumbered) of the filter or filter media 181 resulting in a backwash thereof.

The pump 201 is, of course, energized over a suitable electrical conductor 220 which is connected to the house panel or control panel 132 and a suitable power source via electrical conductors 221 with the connections between the conductors 220, 221 being in a moisture-proof removable connector 223 supported by a solid nontubular pipe 224 supported from the arm 204 of the cross-fitting 203.

Although only a preferred embodiment of the invention has been specifically illustrated and described herein, it is to be understood that minor variations may be made in the apparatus without departing from the spirit and scope of the invention, as defined in the appended claims.

What is claimed is:

1. A wastewater treatment plant comprising means for defining a pretreatment chamber, means defining an inlet for introducing fluid into said pretreatment chamber, means for defining an aeration chamber, means for conducting fluid from said pretreatment chamber into said aeration chamber, rotating means for aerating the fluid in said aeration chamber, means for defining a clarification chamber, means for conducting fluid from said aeration chamber into said clarification chamber, means defining an outlet for discharging the fluid from said clarification chamber, means for filtering the fluid discharging from said clarification chamber, said filtering means having a filtering surface of a predetermined area, said filtering surface being positioned such that only a portion of said predetermined filtering surface area is operative at a predetermined fluid level in said clarification chamber and other portions of said predetermined filtering surface area are rendered progressively operative as the predetermined fluid level rises thereby increasing the filtering capacity of said filtering means in response to fluid level rise in said clarification chamber, said rotating aerating means carrying means for inducing torque in response to an inoperative condition of said filtering means and a corresponding rise in the fluid level in said aeration chamber, and means for responding to the induced torque.

2. The wastewater treatment plant as defined in claim 1 including overflow outlet means in said clarification chamber for discharging the fluid from said clarification chamber when said filtering means has reached its inoperative condition.

3. The wastewater treatment plant as defined in claim 1 including overflow outlet means in said clarification chamber for discharging the fluid from said clarification chamber when said filtering means has reached its inoperative condition, said clarification chamber outlet and overflow outlet each having a respective inlet end and an outlet end, said clarification chamber overflow outlet outlet end being in fluid communication with said clarification chamber outlet inlet end, and said clarification chamber overflow outlet inlet end being disposed in said clarification chamber at a predetermined distance above said clarification chamber outlet inlet end.

4. The wastewater treatment plant as defined in claim 1 including overflow outlet means in said clarification chamber for discharging the fluid from said clarification chamber when said filtering means has reached its inoperative condition, said clarification chamber outlet and overflow outlet each having a respective inlet end and an outlet end, said clarification chamber overflow outlet outlet end being in fluid communication with said clarification chamber outlet inlet end, said clarification chamber overflow outlet inlet end being disposed in said clarification chamber at a predetermined distance above said clarification chamber outlet inlet end, and said filtering means is in fluid communication with said clarification chamber overflow outlet outlet end and said clarification chamber outlet inlet end.

5. The wastewater treatment plant as defined in claim 1 including overflow outlet means in said clarification chamber for discharging the fluid from said clarification chamber when said filtering means has reached its inoperative condition, said clarification chamber outlet and overflow outlet each having a respective inlet and an outlet end, said clarification chamber overflow outlet outlet end being in fluid communication with said clarification chamber outlet inlet end, said clarification chamber overflow outlet inlet end being disposed in said clarification chamber at a predetermined distance above said clarification chamber outlet inlet end, said filtering means is in fluid communication with said clarification chamber overflow outlet outlet end and said clarification chamber outlet inlet end, and the fluid communication between said filtering means, said clarification chamber overflow outlet and said clarification chamber outlet is defined by a generally T-shaped fitting.

6. The wastewater treatment plant as defined in claim 1 including overflow outlet means in said clarification chamber for discharging the fluid from said clarification chamber when said filtering means has reached its inoperative condition, said clarification chamber outlet and overflow outlet each having a respective inlet end and an outlet end, said clarification chamber overflow outlet outlet end being in fluid communication with said clarification chamber outlet inlet end, said clarification chamber overflow outlet inlet end being disposed in said clarification chamber at a predetermined distance above said clarification chamber outlet inlet end, said filtering means is in fluid communication with said clarification chamber overflow outlet outlet end and said clarification chamber outlet inlet end, the fluid communication between said filtering means, said clarification chamber overflow outlet and said clarification chamber outlet is defined by a generally T-shaped fitting, and said clarification chamber overflow outlet and said clarification chamber outlet are disposed generally transversely.

7. The wastewater treatment plant as defined in claim 1 including overflow outlet means in said clarification chamber for discharging the fluid from said clarification chamber when said filtering means has reached its inoperative condition, said clarification chamber outlet and overflow outlet each having a respective inlet end and an outlet end, said clarification chamber overflow outlet outlet end being in fluid communication with said clarification chamber outlet inlet end, said clarification chamber overflow outlet inlet end being disposed in said clarification chamber at a predetermined distance above said clarification chamber outlet inlet end, said filtering means is in fluid communication with said clarification chamber overflow outlet outlet end and said clarification chamber outlet inlet end, the fluid communication between said filtering means, said clarification chamber overflow outlet and said clarification chamber outlet is defined by a generally T-shaped fitting, said clarification chamber overflow outlet and said clarification chamber outlet are disposed generally transversely, and said filtering means and said clarification chamber outlet are disposed generally in alignment.

8. The wastewater treatment plant as defined in claim 1 including overflow outlet means in said clarification chamber for discharging the fluid from said clarification chamber when said filtering means has reached its inoperative condition, said clarification chamber overflow outlet includes an inlet end and an outlet end, said inlet end being disposed at a predetermined level in said clarification chamber, and said responsive means being located in said aeration chamber at a predetermined level which is below said inlet end level.

9. The wastewater treatment plant as defined in claim 1 including overflow outlet means in said clarification chamber for discharging the fluid from said clarification chamber when said filtering means has reached its inoperative condition, said clarification chamber outlet and overflow outlet each having a respective inlet end and an outlet end, said clarification chamber overflow outlet inlet end being disposed at a predetermined level in said clarification chamber above said clarification chamber outlet inlet end, and said responsive means being located in said aeration chamber at a predetermined level which is between the levels of said clarification chamber outlet inlet end and said clarification chamber overflow outlet inlet end.

10. The wastewater treatment plant as defined in claim 1 wherein said aerating means includes a shaft, an electric motor for rotating said shaft, said shaft having a portion normally within and a portion normally out of the fluid in said aeration chamber under normal operation, and said torque inducing means is carried by said shaft portion normally outside of and above the fluid in said aeration chamber under normal operation.

11. The wastewater treatment plant as defined in claim 1 wherein said aerating means includes a shaft, an electric motor for rotating said shaft, said shaft having a portion normally within and a portion normally out of the fluid in said aeration chamber under normal operation, said torque inducing means is carried by said shaft portion normally outside of and above the fluid in said aeration chamber under normal operation, and said torque inducing means is operative for increasing the torque on said rotating shaft under above-normal levels of fluid in said aeration chamber.

12. The wastewater treatment plant as defined in claim 1 wherein said aerating means includes a shaft, an electric motor for rotating said shaft, said shaft having a portion normally within and a portion normally without the fluid in said aeration chamber under normal operation, said torque inducing means is carried by said shaft portion normally outside of and above the fluid in said aeration chamber under normal operation, said torque inducing means is operative for increasing the torque on said rotating shaft under above-normal levels of fluid in said aeration chamber, and said torque inducing means projects radially from said shaft.

13. The wastewater treatment plant as defined in claim 1 wherein said aerating means includes a shaft, an electric motor for rotating said shaft, said shaft having a portion normally within and a portion normally without the fluid in said aeration chamber under normal operation, said torque inducing means is carried by said shaft portion normally outside of and above the fluid in said aeration chamber under normal operation, said torque inducing means is operative for increasing the torque on said rotating shaft under above-normal levels of fluid in said aeration chamber, and said torque inducing means includes at least one vane projecting radially from said shaft.

14. The wastewater treatment plant as defined in claim 1 wherein said aerating means includes a shaft, an electric motor for rotating said shaft, said shaft having a portion normally within and a portion normally without the fluid in said aeration chamber under normal operation, said torque inducing means is carried by said shaft portion normally outside of and above the fluid in said aeration chamber under normal operation, said torque inducing means is operative for increasing the torque on said rotating shaft under above-normal levels of fluid in said aeration chamber, said shaft is tubular and includes a terminal end portion disposed remote from said electric motor, air inlet means for admitting air into said tubular shaft, and air outlet means at said terminal end portion for exhausting air from said tubular shaft into the fluid within the aeration chamber.

15. The wastewater treatment plant as defined in claim 1 wherein said aerating means includes a shaft, an electric motor for rotating said shaft, said shaft having a portion normally within and a portion normally without the fluid in said aeration chamber under normal operation, said torque inducing means is carried by said shaft portion normally outside of and above the fluid in said aeration chamber under normal operation, said torque inducing means is operative for increasing the torque on said rotating shaft under above-normal levels of fluid in said aeration chamber, means for defining a housing surrounding said electric motor, and bracket means for suspendingly supporting said electric motor within said housing means.

16. The wastewater treatment plant as defined in claim 1 wherein said aerating means includes a shaft, an electric motor for rotating said shaft, said shaft having a portion normally within and a portion normally without the fluid in said aeration chamber under normal operation, said torque inducing means is carried by said shaft portion normally outside of and above the fluid in said aeration chamber under normal operation, said torque inducing means is operative for increasing the torque on said rotating shaft under above-normal levels of fluid in said aeration chamber, means for defining a housing surrounding said electric motor, said housing having a bottom wall, an opening in said bottom wall through which projects said shaft, and said housing means being air-tight in a portion thereof surrounding said electric motor whereby fluid which rises within said aeration chamber and begins entering said housing means through said opening will be prevented from flooding said housing means and the electric motor therein under the influence of the entrapped air within said housing means portion.

17. The wastewater treatment plant as defined in claim 1 including means for defining an overflow chamber, said clarification chamber outlet being in fluid communication with said overflow chamber, and means for pumping fluid from said overflow chamber to said filtering means to clean said filtering means and render said inoperative means operative.

18. The wastewater treatment plant as defined in claim 1 including means for defining an overflow chamber, said clarification chamber outlet being in fluid communication with said overflow chamber, means for pumping fluid from said overflow chamber to said filtering means to clean said filtering means and render said inoperative means operative, said fluid pumping means is an electric pump, and means responsive to a predetermined depth of fluid in said overflow chamber for actuating the operation of said electric pump.

19. The wastewater treatment plant as defined in claim 1 including means for defining an overflow chamber, said clarification chamber outlet being in fluid communication with aid overflow chamber, means for pumping fluid from said overflow chamber to said filtering means to clean said filtering means and render said inoperative means operative, and said pumping means includes conduit means for conducting fluid from said overflow chamber through said clarification chamber outlet and into an interior of said filtering means.

20. The wastewater treatment plant as defined in claim 1 including means for defining an overflow chamber, said clarification chamber outlet being in fluid communication with said overflow chamber, means for pumping fluid from said overflow chamber to said filtering means to clean said filtering means and render said inoperative means operative, said pumping means includes conduit means for conducting fluid from said overflow chamber through said clarification chamber outlet and into an interior of said filtering means, said conduit means including a portion having a plurality of orifices disposed within said filtering means interior, said conduit portion being in generally coaxial relationship to said filtering means, and said plurality of orifices being disposed to direct fluid therefrom against a plurality of different areas of said filtering means to effectively backwash the same.

21. The wastewater treatment plant as defined in claim 1 including means for defining an overflow chamber, said clarification chamber outlet being in fluid communication with said overflow chamber, means for pumping fluid from said overflow chamber to said filtering means to clean said filtering means and render said inoperative means operative, said overflow chamber having an outlet, and said pumping means being operative for pumping fluid from said overflow chamber outwardly therefrom through said overflow chamber outlet.

22. The wastewater treatment plant as defined in claim 1 including means for defining an overflow chamber, said clarification chamber outlet being in fluid communication with said overflow chamber, means for pumping fluid from said overflow chamber to said filtering means to clean said filtering means and render said inoperative means operative, said overflow chamber having an outlet, and said pumping means being operative for pumping fluid from said overflow chamber outwardly therefrom through said overflow chamber outlet while simultaneously pumping fluid from said overflow chamber to said filtering means.

23. The wastewater treatment plant as defined in claim 1 including means for defining an overflow chamber, said clarification chamber outlet being in fluid communication with said overflow chamber, means for pumping fluid from said overflow chamber to said filtering means to clean said filtering means and render said inoperative means operative, said overflow chamber having an outlet, said pumping means being operative for pumping fluid from said overflow chamber outwardly therefrom through said overflow chamber outlet while simultaneously pumping fluid from said overflow chamber to said filtering means, and means for establishing a proportional flow of fluid relative to said overflow chamber outlet and to said filtering means.

24. The wastewater treatment plant as defined in claim 1 including means for defining an overflow chamber, said clarification chamber outlet being in fluid communication with said overflow chamber, means for pumping fluid from said overflow chamber to said filtering means to clean said filtering means and render said inoperative means operative, and overflow outlet means in said clarification chamber for receiving fluid at a predetermined level above normal in said clarification chamber and delivering the same to said clarification chamber outlet.

25. The wastewater treatment plant as defined in claim 1 including means for defining an overflow chamber, said clarification chamber outlet being in fluid communication with said overflow chamber, means for pumping fluid from said overflow chamber to said filtering means to clean said filtering means and render said inoperative means operative, overflow outlet means in said clarification chamber for receiving fluid at a predetermined level above normal in said clarification chamber and delivering the same to said clarification chamber outlet, said clarification chamber outlet and overflow outlet each having a respective inlet end and an outlet end, said clarification chamber overflow outlet outlet end being in fluid communication with said clarification chamber outlet inlet, said clarification chamber overflow outlet inlet end being disposed in said clarification chamber at a predetermined distance above said clarification chamber outlet inlet end, and said clarification chamber outlet outlet being the inlet of said overflow chamber.

26. The wastewater treatment plant as defined in claim 1 including means for defining an overflow chamber, said clarification chamber outlet being in fluid communication with said overflow chamber, means for pumping fluid from said overflow chamber to said filtering means to clean said filtering means and render said inoperative means operative, overflow outlet means in said clarification chamber for receiving fluid at a predetermined level above normal in said clarification chamber and delivering the same to said clarification chamber outlet, said clarification chamber outlet and overflow outlet each having a respective inlet end and an outlet end, said clarification chamber overflow outlet outlet end being in fluid communication with said clarification chamber outlet inlet, said clarification chamber overflow outlet inlet end being disposed in said clarification chamber at a predetermined distance above said clarification chamber outlet inlet end, said clarification chamber outlet outlet end being the inlet of said overflow chamber, and said filtering means is in fluid communication with said clarification chamber overflow outlet outlet end and said clarification chamber outlet inlet end.

27. The wastewater treatment plant as defined in claim 1 including means for defining an overflow chamber, said clarification chamber outlet being in fluid communication with said overflow chamber, means for pumping fluid from said overflow chamber to said filtering means to clean said filtering means and render said inoperative means operative, overflow outlet means in said clarification chamber for receiving fluid at a predetermined level above normal in said clarification chamber and delivering the same to said clarification chamber outlet, said clarification chamber outlet and overflow outlet each having a respective inlet end and an outlet end, said clarification chamber overflow outlet outlet end being in fluid communication with said clarification chamber outlet inlet, said clarification chamber overflow outlet inlet end being disposed in said clarification chamber at a predetermined distance above said clarification chamber outlet inlet end, said clarification chamber outlet outlet end being the inlet of said overflow chamber, said filtering means is in fluid communication with said clarification chamber overflow outlet outlet end and said clarification chamber outlet inlet end, and the fluid communication between said filtering means, said clarification chamber overflow outlet and said clarification outlet is defined by a generally T-shaped fitting.

28. The wastewater treatment plant as defined in claim 1 including means for defining an overflow chamber, said clarification chamber outlet being in fluid communication with said overflow chamber, means for pumping fluid from said overflow chamber to said filtering means to clean said filtering means and render said inoperative means operative, overflow outlet means in said clarification chamber for receiving fluid at a predetermined level above normal in said clarification chamber and delivering the same to said clarification chamber outlet, said clarification chamber outlet and overflow outlet each having a respective inlet end and an outlet end, said clarification chamber overflow outlet outlet end being in fluid communication with said clarification chamber outlet inlet, said clarification chamber overflow outlet inlet end being disposed in said clarification chamber at a predetermined distance above said clarification chamber outlet inlet end, said clarification chamber outlet outlet end being the inlet of said overflow chamber, said filtering means is in fluid communication with said clarification chamber overflow outlet outlet end and said clarification chamber outlet inlet end, the fluid communication between said filtering means, said clarification chamber overflow outlet and said clarification outlet is defined by a generally T-shaped fitting, and said clarification chamber overflow outlet and said clarification chamber outlet are disposed generally transversely.

29. The wastewater treatment plant as defined in claim 1 including means for defining an overflow chamber, said clarification chamber outlet being in fluid communication with said overflow chamber, means for pumping fluid from said overflow chamber to said filtering means to clean said filtering means and render said inoperative means operative, overflow outlet means in said clarification chamber for receiving fluid at a predetermined level above normal in said clarification chamber and delivering the same to said clarification chamber outlet, said clarification chamber outlet and overflow outlet each having a respective inlet end and an outlet end, said clarification chamber overflow outlet outlet end being in fluid communication with said clarification chamber outlet inlet, said clarification chamber overflow outlet inlet end being disposed in said clarification chamber at a predetermined distance above said clarification chamber outlet inlet end, said clarification chamber outlet outlet end being the inlet of said overflow chamber, said filtering means is in fluid communication with said clarification chamber overflow outlet outlet end and said clarification chamber outlet inlet end, the fluid communication between said filtering means, said clarification chamber overflow outlet and said clarification chamber outlet is defined by a generally T-shaped fitting, said clarification chamber overflow outlet and said clarification chamber outlet are disposed generally transversely, and said filtering means and said clarification chamber outlet are disposed generally in alignment.

30. The wastewater treatment plant as defined in claim 1 including means for defining an overflow chamber, said clarification chamber outlet being in fluid communication with said overflow chamber, means for pumping fluid from said overflow chamber to said filtering means to clean said filtering means and render said inoperative means operative, said aerating means includes a shaft, an electric motor for rotating said shaft, said shaft having a portion normally within and a portion normally without the fluid in said aeration chamber under normal operation, and said torwque inducing means is carried by said shaft portion normally outside of and above the fluid in said aeration chamber under normal operation.

31. The wastewater treatment plant as defined in claim 1 including means for defining an overflow chamber, said clarification chamber outlet being in fluid communication with said overflow chamber, means for pumping fluid from said overflow chamber to said filtering means to clean said filtering means and render said inoperative means operative, said aerating means includes a shaft, an electric motor for rotating said shaft, said shaft having a portion normally within and a portion normally without the fluid in said aeration chamber under normal operation, said torque inducing means is carried by said shaft portion normally outside of and above the fluid in said aeration chamber under normal operation, and said torque inducing means is operative for increasing the torque on said rotating shaft under above normal levels of fluid in said areation chamber.

32. The wastewater treatment plant as defined in claim 1 including means for defining an overflow chamber, said clarification chamber outlet being in fluid communication with said overflow chamber, means for pumping fluid from said overflow chamber to said filtering means to clean said filtering means and render said inoperative means operative, said aerating means includes a shaft, an electric motor for rotating said shaft, said shaft having a portion normally within and a portion normally without the fluid in said aeration chamber under normal operation, said torque inducing means is carried by said shaft portion normally outside of and above the fluid in said aeration chamber under normal operation, said torque inducing means is operative for increasing the torque on said rotating shaft under above normal levels of fluid in said aeration chamber, and said torque reducing means projects radially from said shaft.

33. The wastewater treatment plant as defined in claim 1 including means for defining an overflow chamber, said clarification chamber outlet being in fluid communication with said overflow chamber, means for pumping fluid from said overflow chamber to said filterng means to clean said filtering means and render said inoperative means operative, said aerating means includes a shaft, an electric motor for rotating said shaft, said shaft having a portion normally within and a portion normally without the fluid in said aeration chamber under normal operation, said torque inducing means is carried by said shaft portion normally outside of and above the fluid in said aeration chamber under normal operation, said torque inducing means is operative for increasing the torque on said rotating shaft under above normal levels of fluid in said aeration chamber, and said torque inducing means includes at least one vane projecting radially from said shaft.

34. The wastewater treatment plant as defined in claim 1 including means for defining an overflow chamber, said clarification chamber outlet being in fluid communication with said overflow chamber, means for pumping fluid from said overflow chamber to said filtering means to clean said filtering means and render said inoperative means operative, said aerating means includes a shaft, an electric motor for rotating said shaft, said shaft having a portion normally within and a portion normally without the fluid in said aeration chamber under normal operation, said torque inducing means is carried by said shaft portion normally outside of and above the fluid in said aeration chamber under normal operation, said torque inducing means is operative for increasing the torque on said rotating shaft under above normal levels of fluid in said aeration chamber, said shaft is tubular and includes a terminal end portion disposed remote from said electric motor, air inlet means for admitting air into said tubular shaft, and air outlet means at said terminal end portion for exhausting air from said tubular shaft into the fluid within the aeration chamber.

35. The wastewater treatment plant as defined in claim 1 including means for defining an overflow chamber, said clarification chamber outlet being in fluid communication with said overflow chamber, means for pumping fluid from said overflow chamber to said filtering means to clean said filtering means and render said inoperative means operative, said aerating means includes a shaft, an electric motor for rotating said shaft, said shaft having a portion normally within and a portion normally without the fluid in said aeration chamber under normal operation, said torque inducing means is carried by said shaft portion normally outside of and above the fluid in said aeration chamber under normal operation, said torque inducing means is operative for increasing the torque on said rotating shaft under above normal levels of fluid in said aeration chamber, means for defining a housing surrounding said electric motor, and bracket means for suspendingly supporting said electric motor within said housing means.

36. The wastewater treatment plant as defined in claim 1 including means for defining an overflow chamber, said clarification chamber outlet being in fluid communication with said overflow chamber, means for pumping fluid from said overflow chamber to said filtering means to clean said filtering means and render said inoperative means operative, said aerating means includes a shaft, an electric motor for rotating said shaft, said shaft having a portion normally within and a portion normally without the fluid in said aeration chamber under normal operation, said torque inducing means is carried by said shaft portion normally outside of and above the fluid in said aeration chamber under normal operation, said torque inducing means is operative for increasing the torque on said rotating shaft under above normal levels of fluid in said aeration chamber, means for defining a housing surrounding said electric motor, said housing having a bottom wall, an opening in said bottom wall through which projects said shaft, and said housing means being air-tight in a portion thereof surrounding said electric motor whereby fluid which rises within said aeration chamber and begins entering said housing means through said opening will be prevented from flooding said housing means and the electric motor therein under the influence of the entrapped air within said housing means portion.

37. The wastewater treatment plant as defined in claim 1 including means for defining an overflow chamber, and said clarification chamber outlet being in fluid communication with said overflow chamber.

38. The wastewater treatment plant as defined in claim 1 including means for defining an overflow chamber, said clarification chamber outlet being in fluid communication with said overflow chamber, a common wall between said pretreatment chamber and said aeration chamber, said fluid conducting means between said latter chambers being an opening in said common wall, and a baffle wall disposed between and in spaced relationship to said pretreatment chamber inlet and said common wall opening whereby fluid must bridge said common wall during the flow thereof from said pretreatment chamber inlet to said common wall opening.

39. The wastewater treatment plant as defined in claim 1 including means for defining an overflow chamber, said clarification chamber outlet being in fluid communication with said overflow chamber, said chambers being defined in part by a top wall, and a tubular riser above the top wall of said aerator and clarification chambers.

40. The wastewater treatment plant as defined in claim 1 including means for defining an overflow chamber, said clarification chamber outlet being in fluid communication with said overflow chamber, and means for pumping fluid from said overflow chamber though said filtering means in a reverse flow direction to clean said filtering means and render said inoperative filtering means operative.

41. The wastewater treatment plant as defined in claim 1 including means for defining an overflow chamber, said clarification chamber outlet being in fluid communication with said overflow chamber, means for pumping fluid from said overflow chamber through said filtering means in a reverse flow direction to clean said filtering means and render said inoperative filtering means operative, and said pumping means includes conduit means for conducting fluid from said overflow chamber through said clarification chamber outlet and into an interior of said filtering means.

42. The wastewater treatement plant as defined in claim 1 including means for defining an overflow chamber, said clarification chamber outlet being in fluid communication with said overflow chamber, means for pumping fluid from said overflow chamber through said filtering means in a reverse flow direction to clean said filtering means and render said inoperative filtering means operative, said pumping means includes conduit means for conducting fluid from said overflow chamber through said clarification chamber outlet and into an interior of said filtering means, said conduit means including at least one orifice means for directing reverse flow water in a downward direction within said filtering means interior to effectively backwash the same.

43. The wastewater treatement plant as defined in claim 1 including means for defining an overflow chamber, said clarification chamber outlet being in fluid communication with said overflow chamber, means for pumping fluid from said overflow chamber through said filtering means in a reverse flow direction to clean said filtering means and render said inoperative filtering means operative, said overflow chamber having an outlet, and said pumping means being operative for pumping fluid from said overflow chamber outwardly therefrom through said overflow chamber outlet while simultaneously pumping fluid from said overflow chamber through said filtering means.

44. In a wastewater treatment plant including means defining a clarification chamber for fluid, means defining an overflow chamber for fluid, conduit means for conducting fluid from said clarification chamber to said overflow chamber, said conduit means including means defining an inlet opening into said clarification chamber and means defining an outlet opening into said overflow chamber, filtering means for filtering material from the fluid before the fluid enters said inlet, said overflow chamber having means defining an outlet, the improvement comprising means for pumping fluid from said overflow chamber to said filtering means to clean said filtering means, and said fluid pumping means being constructed and arranged for simultaneously pumping fluid from said overflow chamber outwardly therefrom through said overflow chamber outlet while pumping fluid to clean said filtering means.

45. The improvement in a wastewater treatment plant as defined in claim 44 wherein said conduit means includes a means defining a second inlet opening into said clarification chamber at a height above said first-mentioned inlet whereby upon blockage of said filtering means and a corresponding rise in the fluid level in said clarification chamber excess fluid will overflow into said second inlet.

46. The improvement in a wastewater treatment plant as defined in claim 45 wherein said pumping means includes pipe means for conducting fluid from said overflow chamber through said conduit means into an interior of said filtering means through said first-mentioned inlet.

47. The improvement in a wastewater treatment plant as defined in claim 46 wherein said first-mentioned and second inlets are part of a T-fitting.

48. The improvement in a wastewater treatment plant as defined in claim 46 wherein said pipe means includes a portion having a plurality of orifices disposed within said filtering means interior, said pipe means portion being in generally coaxial relationship to said filtering means, and said plurality of orifices being disposed to direct fluid therefrom against a plurality of different areas of said filtering means to effectively backwash the same.

49. The improvement in a wastewater treatment plant as defined in claim 48 wherein said filtering means is an annular filter having a generally horizontally disposed axis.

50. The improvement in a wastewater treatment plant as defined in claim 49 wherein said first-mentioned and second inlets ar part of a T-fitting.

51. The improvement in a wastewater treatment plant as defined in claim 50 wherein said pipe means is at least partially flexible.

21

52. The improvement in a wastewater treatment plant as defined in claim 44 including means responsive to a predetermined depth of fluid in said overflow chamber for actuating said fluid pumping means.

53. The improvement in a wasewater treatment plant as defined in claim 44 wherein said pumping means includes pipe means for conducting fluid from said overflow chamber through said conduit means into an interior of said filtering means.

54. The improvement in a wastewater treatment plant as defined in claim 44 wherein said pumping means includes pipe means for conducting fluid from said overflow chamber through said conduit means into an interior of said filtering means, said pipe means including a portion having a plurality of orifices disposed within said filtering means interior, said pipe means portion being in generally coaxial relationship to said filtering means, and said plurality of orifices being disposed to direct fluid therefrom against a plurality of different areas of said filtering means to effectively backwash the same.

55. The improvement in a wastewater treatment plant as defined in claim 44 including means for establishing a proportional flow of fluid relative to said overflow chamber outlet and to said filtering means.

56. The improvement in a wastewater treatment plant as defined in claim 44 wherein said fluid pumping means includes dispensing means within said filtering means for directing fluid in at least a downward direction against an inside surface of said filtering means to clean said filtering means.

57. The improvement in a wastewater treatment plant as defined in claim 44 wherein said fluid pumping means is a single pump.

58. In a wastewater treatment plant including means defining a clarification chamber for fluid, outlet means for conducting fluid outwardly of said clarification chamber, said clarification chamber outlet means having an axis, and filter means for filtering material from the fluid before the fluid enters said clarification chamber outlet means, the improvement comprising means for conducting excess fluid from said clarification chamber into said clarification chamber outlet means while by-passing said filtering means and as a result of filtering means blockage, said conducting means including means defining a conduit inlet and an outlet having a respective inlet axis and an outlet axis, said conduit outlet being disposed between said filtering means and said clarification chamber outlet means, said conduit inlet being disposed at an elevation above said filtering means whereby should said filtering means become blocked the fluid in the clarification chamber will rise and enter said conduit inlet, said conduit inlet axis and said clarification chamber outlet means axis being disposed generally transversely, said filtering means having a generally cylindrical outer filter surface, and said filtering means having an axis disposed generally horizontally and in alignment with said clarification chamber outlet means axis.

59. The improvement in a wastewater treatment plant as defined in claim 58 wherein said clarification chamber is defined at least in part by a wall of cast solidified material, a T-fitting cast in situ in said wall, said T-fitting including a leg, and said conduit outlet being connected to said leg.

60. The improvement in a wastewater treatment plant as defined in claim 59 wherein said T-fitting is inverted, said T-fitting includes a pair of aligned arms, said filtering means is connected to one of said arms, another of said arms at least in part define said outlet means, and said leg is disposed generally vertically.

61. In a wastewater treatment plant including means defining a clarification chamber for fluid, outlet means for conducting fluid outwardly of said clarification chamber, and filter means for filtering material from the fluid before the fluid enters said outlet means, the improvement comprising means for conducting excess fluid from said clarification chamber into said outlet means while by-passing said filtering means and as a result of filtering means blockage, said conducting means including a conduit having an inlet and an outlet, said conduit outlet being disposed between said filtering means and said outlet means, said conduit inlet being disposed at an elevation above said filtering means whereby should said filtering means become blocked the fluid in the clarification chamber will rise and enter said conduit inlet, said clarification chamber being defined at least in part by a wall of cast solidified material, a T-fitting cast in situ in said wall, said T-fitting including a leg, said conduit outlet being connected to said leg, said T-fitting being inverted with said leg disposed generally vertically, said T-fitting includes a pair of arms disposed generally horizontally, each of said pair of arms having an axis, said filtering means being connected to one of said arms, another of said arms at least in part defining said outlet means, said filtering means being cylindrical and having an axis disposed horizontally, and said filtering means axis and the axis of said one arm being generally in alignment.

62. The improvement in a wastewater treatment plant as defined in claim 61 wherein said pair of arms are in axial alignment.

63. A wastewater treatment plant comprising means for defining a pretreatment chamber, means defining an inlet for introducing fluid into said pretreatment chamber, means for defining an aeration chamber, means for conducting fluid from said pretreatment chamber into said aeration chamber, means for aerating the fluid in said aeration chamber, means for defining a clarification chamber, means for conducting fluid from said aeration chamber into said clarification chamber, means defining an outlet for discharging fluid from said clarification chamber, said pretreatment, aeration and clarification chambers each including upper and lower chamber portions, said pretreatment, aeration and clarification upper chamber portions being a single one-piece homogeneous in situ casting, said pretreatment, aeration and clarification lower chamber portions being a single one-piece homogeneous in situ casting, said first-mentioned and second-mentioned castings having respective top and bottom walls and peripherally matching lower and upper peripheral edges, an opening in said top wall associated with each said pretreatment, aeration and clarification upper chamber portions, a cover for removably closing said pretreatment opening, a generally tubular housing contiguous said aeration opening, said aerating means being disposed at least partially within said tubular housing, a generally tubular housing contiguous said clarification opening, means for conducting overflow fluid from said clarification chamber into said clarification chamber outlet, said overflow conducting means including a pipe, said pipe having an inlet disposed within said last-mentioned tubular housing, means for filtering the fluid prior to the discharge thereof from said clarification chamber, said filtering means having a filtering surface of a predetermined area, said filtering surface being positioned such that only a portion of said predetermined filtering surface area is operative at a predetermined fluid level in said clarification chamber and other portions of said predetermined filtering surface area are rendered progressively operative as the predetermined fluid level rises thereby increasing the filtering capacity of said filtering means in response to fluid level rise in said clarification chamber, said aerating means carrying means for inducing torque in response to an inoperative condition of said filtering means and a corresponding rise in the fluid level in said aeration chamber, means for responding to the induced torque, said aerating means includes a shaft, an electric motor for rotating said shaft, said shaft having a portion normally within and a portion normally without the fluid in said aeration chamber under normal operation, said torque inducing means being carried by said shaft portion normally outside of and above the fluid in said aeration chamber under normal operation, and said torque inducing means being operative for increasing the torque on said rotating shaft under above normal levels of fluid in said aeration chamber.

64. A wastewater treatment plant comprising means for defining a pretreatment chamber, means defining an inlet for introducing fluid into said pretreatment chamber, means for defining an aeration chamber, means for conducting fluid from said pretreatment chamber into said aeration chamber, means for aerating the fluid in said aeration chamber, means for rotating said aerating means, means for defining a clarification chamber, means for conducting fluid from said aeration chamber into said clarification chamber, means defining an outlet for discharging the fluid from said clarification chamber, means for filtering the fluid discharging from said clarification chamber, said filtering means having a filtering surface of a predetermined area, said filtering surface being positioned such that only a portion of said predetermined filtering surface area is operative at a predetermined fluid level in said clarification chamber and other portions of said predetermined filtering surface area are rendered progressively operative as the predetermined fluid level rises thereby increasing the filtering capacity of said filtering means in response to fluid level rise in said clarification chamber, said rotating aerating means carrying means for inducing torque in response to an inoperative condition of said filtering means, and means for responding to the induced torque.

65. A wastewater treatment plant comprising means for defining a pretreatment chamber, means defining an inlet for introducing fluid into said pretreatment chamber, means for defining an aeration chamber, means for conducting fluid from said pretreatment chamber into said aeration chamber, means for aerating the fluid in said aeration chamber, means for rotating said aerating means, means for defining a clarification chamber, means for conducting fluid from said aeration chamber into said clarification chamber, means defining an outlet for discharging the fluid from said clarification chamber, means for defining an overflow chamber, said clarification chamber outlet being in fluid communication with said overflow chamber, means for pumping fluid from said overflow chamber into said clarification chamber and to atmosphere to maintain the fluid level in said clarification chamber at a desired normal level, said rotating aerating means carrying means for inducing torque in response to pump inoperativeness and an increase in the fluid level in said clarification chamber above the desired normal level for indicating pumping means malfunction and means for responding to the induced torque.

66. A wastewater treatment plant comprising means for defining a pretreatment chamber, an inlet for introducing fluid into said pretreatment chamber, means for defining an aeration chamber, means for conducting fluid from said pretreatment chamber into said aeration chamber, means for aerating the fluid in said aeration chamber, means for defining a clarification chamber, means for conducting fluid from said aeration chamber into said clarification chamber, an outlet for discharging the fluid from said clarification chamber, means for filtering the fluid discharging from said clarification chamber, means for defining an overflow chamber, said clarification chamber outlet being in fluid communication with said overflow chamber, said overflow chamber having an outlet, means for pumping fluid from said overflow chamber to atmosphere through said overflow chamber outlet and into said clarification chamber, through said clarification outlet and filtering means, and said aerating means including means responsive to a rise in the fluid level in said aeration chamber.

67. A wastewater treatment plant comprising means for defining a pretreatment chamber, means defining an inlet for introducing fluid into said pretreatment chamber, means for defining an aeration chamber, means for conducting fluid from said pretreatment chamber into said aeration chamber, means for aerating the fluid in said aeration chamber, means for defining a clarification chamber, means for conducting fluid from said aeration chamber into said clarification chamber means defining, an outlet for discharging the fluid from said clarification chamber, means for filtering the fluid discharging from said clarification chamber, said filtering means being constructed and arranged for increasing its filtering capacity in response to fluid level rise in said clarification chamber, said filtering means being a filtering member having a filtering surface, said filtering member being positioned at an uppermost portion of said clarification chamber and in fluid communication with said clarification chamber outlet, said fluid conducting means from said aeration chamber to said clarification chamber having an opening opening into said clarification chamber below said filtering member whereby fluid is transferred into said clarification chamber at a predetermined distance below said filtering member, said filtering member having an uppermost filtering portion and a lowermost filtering portion, said clarification chamber outlet having an upwardly concavely facing flow surface positioned generally on the same level as and aligned with said lowermost filtering portion whereby said clarification chamber outlet flow surface establishes a predetermined and normal operating fluid level within said clarification chamber in which only said lowermost filtering portion is immersed at said normal operating fluid level and thereby fluid initially passes only through said lowermost filtering portion at said predetermined normal operating fluid level and is gravity fed along said flow surface preventing premature contamination of said uppermost filtering portion while progressively permitting filtration therethrough in response to progressive fluid level rise in said clarification chamber.

68. The improvement in a wastewater treatment plant as defined in claim 67 including means for defining an overflow chamber, said clarification chamber outlet being in fluid communication with said overflow chamber, and means for pumping fluid from said overflow chamber to said filtering means to clean said filtering means lower filtering portion.

69. The wastewater treatement plant as defined in claim 67 including means for defining an overflow chamber, said clarification chamber outlet being in fluid communication with said overflow chamber, said filtering means being tubular, and means for pumping fluid from said overflow chamber into said tubular filtering means to clean said filtering means.

* * * * *